United States Patent [19]

Torimoto et al.

[11] Patent Number: 4,731,507

[45] Date of Patent: Mar. 15, 1988

[54] ELECTRICAL INSULATOR STRING WITH BULLET-PROOF PROTECTIVE RINGS

[75] Inventors: Soichi Torimoto, Nagoya; Eiji Senda, Niwa; Morio Nishikawa, Nagoya; Kenji Tanaka, Kasugai, all of Japan

[73] Assignee: NGK Insulators, Ltd., Japan

[21] Appl. No.: 853,895

[22] Filed: Apr. 21, 1986

[30] Foreign Application Priority Data

Apr. 30, 1985 [JP] Japan ............................ 60-64530[U]
Feb. 1, 1986 [JP] Japan ............................ 61-13765[U]

[51] Int. Cl.⁴ ........................ H01B 17/04; F41H 5/04; B32B 15/08

[52] U.S. Cl. .................................. 174/139; 89/36.02; 109/82; 174/150; 428/911

[58] Field of Search ............... 174/139, 140 H, 141 R, 174/150; 89/36.02; 109/49.5, 80, 82, 83, 84; 428/911

[56] References Cited

U.S. PATENT DOCUMENTS 3,431,818 3/1969 King .................................. 89/36.02
3,577,306 5/1971 Baker et al. ...................... 109/80 X
4,016,358 4/1977 Richards ......................... 174/141 R

FOREIGN PATENT DOCUMENTS 0024713 3/1981 European Pat. Off. ........... 89/36.02
2642882 3/1978 Fed. Rep. of Germany ...... 428/911
52-66771 6/1977 Japan .
1578640 11/1980 United Kingdom ................ 428/911

*Primary Examiner*—Laramie E. Askin
*Attorney, Agent, or Firm*—Parkhurst & Oliff

[57] ABSTRACT

A bullet-proof board includes a pair of steel plates of substantially identical thicknesses that sandwich a thick intermediate layer therebetween and a thin surface layer secured to that steel plate surface which faces a striking bullet. The intermediate and surface layers are made of such chemical fiber cloths or synthetic resin plates which absorb energy of a striking bullet. The bullet-proof board may be formed in the shape of a sidewall of a truncated-cone and secured to a suspension insulator for protecting it against gun shooting.

A bullet-proof insulator assembly includes an insulator string formed of suspension insulators coupled to each other, bullet-proof rings, one of which is mounted on each of the suspension insulators, each bullet-proof ring having a shape representing a sidewall of a truncated-cone with a minimum inside diameter larger than the outside diameter of the shed portion of the suspension insulator, and holders mounting the bullet-proof rings to the suspension insulators in such a manner that each bullet-proof ring extends away from a longitudinal axis of the insulator string at an angle of 45–70 degrees relative to the longitudinal axis as the bullet-proof ring extends upwardly and that the minimum distance between adjacent bullet-proof rings (L) is longer than the minimum distance between adjacent suspension insulators (l).

2 Claims, 13 Drawing Figures

ELECTRICAL INSULATOR STRING WITH BULLET-PROOF PROTECTIVE RINGS

BACKGROUND OF THE INVENTION

1. Field of the Invention

This invention relates to an insulator string assembly for overhead transmission lines which assembly includes bullet-proof rings for protecting the individual insulators of the insulator string assembly against bullets.

2. Related Art Statement

To protect insulators of overhead power transmission lines, bullet-proof boards have been used. Typical materials of a conventional bullet-proof board for this purpose are metal plates, bullet-proof glass, polycarbonate sheets, fiber-reinforced plastic (FRP) sheets, special fiber cloths, and the like. Japanese Patent Laid-open Specification No. 66,771/77 discloses some of such materials.

A drawback of such conventional bullet-proof boards is that they are not suitable for protection against high-energy bullets such as 222 Remington bullets. If only steel or other metallic plates are used, the bullet-proof boards for the high-power bullets become very heavy, while if only other materials such as FRP sheet are used, the bullet-proof boards for high-energy bullets become too thick and bulky, for instance three to four times as thick as that in the case of steel plates. Such heavy or bulky bullet-proof boards are not suitable for application to the protection of the insulator strings in overhead transmission lines.

SUMMARY OF THE INVENTION

Therefore, an object of the invention is to overcome the above-mentioned drawback of the prior art by providing an insulator assembly formed from a plurality of suspension insulators coupled to each other with bullet-proof rings of multi-layer structure, which rings are suitable for protection of the individual suspension insulators of the insulator assembly against high-power bullets without becoming too heavy or too bulky.

A preferred embodiment of a bullet-proof board useful for forming the bullet-proof rings of the invention comprises two steel plates having substantially identical thicknesses, which steel plates sandwich a thick intermediate layer therebetween. The intermediate layer is thicker than either of the steel plates and preferably thicker than the combined thicknesses of the steel plates and is made of one or more chemical fiber cloths and/or synthetic resin sheets. A thin surface layer is disposed on that surface of one of the steel plates which faces a striking bullet. The surface layer is thinner than the intermediate layer and made of one or more chemical fiber cloths and/or synthetic resin sheets.

According to the invention, an insulator asssembly using the multi-layer structure of the bullet-proof board comprises an insulator string formed of suspension insulators and bullet-proof rings coupled to the suspension insulators, respectively. The bullet-proof rings are of the same multi-layer structure as that of the above bullet-proof board and have a shape representing the side-wall of a truncated-cone with a minimum inside diameter larger than the outside diameter of a shed portion of the suspension insulator. The insulator assembly also includes holders for mounting the bullet-proof rings to the suspension insulators. The shape of a bullet-proof ring and the manner in which a bullet-proof ring is mounted on a suspension insulator are such that the bullet-proof ring extends away from a longitudinal axis of the insulator string at an angle of 45–70 degrees relative to the longitudinal axis as the bullet-proof ring extends upwardly and that the minimum distance between adjacent bullet-proof rings (L) is longer than the minimum clearance between adjacent suspension insulators (l).

BRIEF DESCRIPTION OF THE DRAWINGS

For a better understanding of the invention, reference is made to the accompanying drawing, in which.

Figure 1:
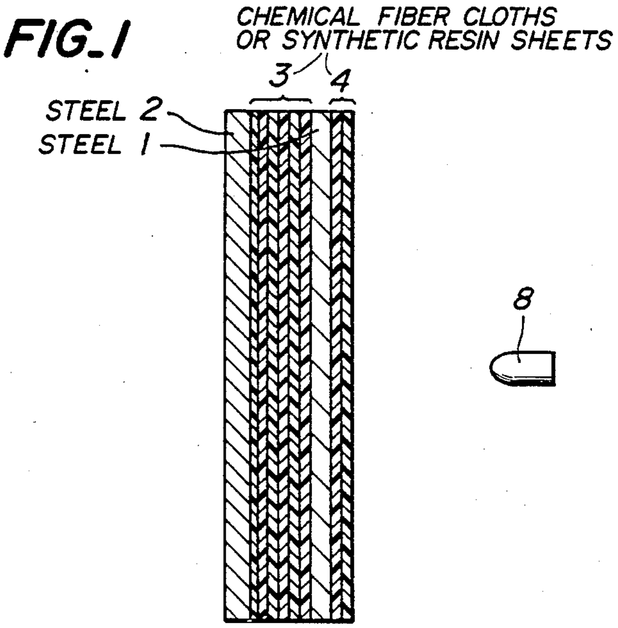
FIG. 1 is a schematic sectional view of a bullet-proof board according to the invention.

Throughout different views of the drawing, 1 and 2 are steel plates, 3 is a thick intermediate layer, 4 is a thin surface layer, 5 is a ring member, 6 is an insulator, 7 is a holder rod, 8 is a bullet, 11 is a suspension insulator, 12 is a shed portion, 13 is a metal cap, 14 is a bullet-proof ring, 15 is a holder, 16 is a packing, 17 and 18 are bolts, 19 is a small hole, 20 is a metal band, 21 is a nut, 22 is a metal socket, 23 is a dish-shaped bullet-proof member, and 24 is a small hole.

DESCRIPTION OF THE PREFERRED EMBODIMENTS

The invention will be explained in detail by referring to the illustrated embodiments. Referring to FIG. 1, two steel plates 1 and 2 sandwich a thick intermediate layer 3. The two steel plates 1, 2 have substantially identical thicknesses, and the intermediate layer 3 is thicker than the steel plate 1 or 2. One of the two steel plates 1 and 2, i.e., the steel plate 1 in the illustrated embodiment, has a thin surface layer 4 formed on the outer surface thereof. When used, the surface layer 4 faces a striking bullet 8. The surface layer 4 is thinner than the intermediate layer 3.

To provide satisfactory protection against a high-energy bullet, such as the above-mentioned 222 Remington bullet, each of the steel plates 1 and 2 is preferably made of a 3.0 mm thick steel plate (SK 4).

Figure 3:
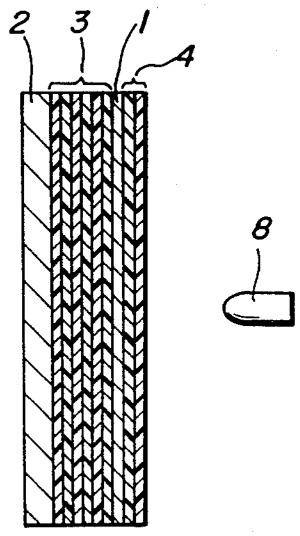
FIG. 3 and FIG. 4 are schematic sectional views of bullet-proof boards which are outside the scope of the invention.

The inventors have found that the two steel plates 1 and 2 should have substantially identical thicknesses in order to achieve satisfactory protection against bullets. For instance, if the steel plate 1 is 1.5 mm thick and the steel plate 2 is 4.5 mm thick, i.e., different thicknesses as shown in FIG. 3, the protection against bullets obtained by such two steel plates has been found inferior to that obtained by the two 3.0 mm thick steel plates despite the same total thickness of the two plates.

The intermediate layer 3 and the surface layer 4 are made of chemical fiber cloths and/or synthetic resin sheets. For instance, they can be made by laminating one or more 1.5 mm thick nylon belts and/or FRP sheets. In the embodiment of FIG. 1, a 9.0 mm thick intermediate layer 3 is made by laminating six 1.5 mm thick nylon belts, and a 3.0 mm thick surface layer 4 is made by laminating two 1.5 mm thick nylon belts.

To absorb bullet energy, it is important to dispose a thick intermediate layer 3, which is made of chemical fiber cloths and/or synthetic resin sheets, between two steel plates 1 and 2 with substantially identical thicknesses. Such arrangement is effective in absorbing bullet energy, particularly its rotating energy. The comparatively thin surface layer 4 is also important from the standpoint of both the initial absorption of rotating energy of the bullet and the prevention of bullet bouncing.

Figure 4:
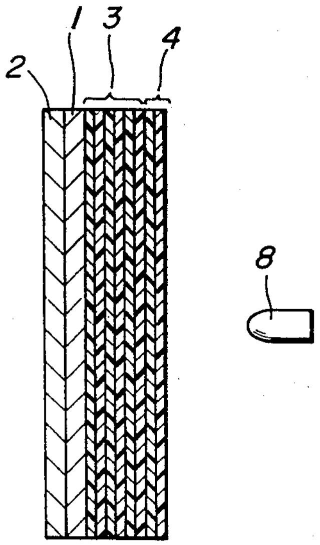

Thus, if the intermediate layer 3 and the surface layer 4 are directly joined as shown in FIG. 4, the protection against bullet becomes inferior to that of the bullet-proof board with the structure of FIG. 1. Even when the structure of FIG. 1 is used, if the bullet 8 strikes the steel plate 2 without the surface layer 4, the bullet 8 can more easily bounce and penetrate therethrough than in the case of striking the steel plate 1 with the surface layer 4.

The performance of the bullet-proof board of the invention will be explained now. When a 222 Remington bullet with an energy of about 150 kg·m strikes the bullet-proof board of FIG. 1, the surface layer 4 prevents the bullet from bouncing and absorbs rotating energy of the bullet to a certain extent, and the outer steel plate 1 attenuates the translational kinetic energy of the bullet to a great extent after the above absorption of the rotating energy. Then, the thick intermediate layer 3 absorbs the rotating energy of the bullet almost completely, so that the bullet cannot penetrate through the inner steel plate 2 and stops there. Thus, the bullet-proof board of the invention provides excellent protection against bullets, which protection will be further demonstrated by Examples hereinafter.

Since both the intermediate layer 3 and the surface layer 4 are made of chemical fiber cloths and/or synthetic resin, the weight of the bullet-proof board of the invention is only about two thirds that of an all steel bullet-proof board with similar performance and yet the thickness increase of the bullet-proof board of the invention over that of the all steel one is only slight.

Figure 2:
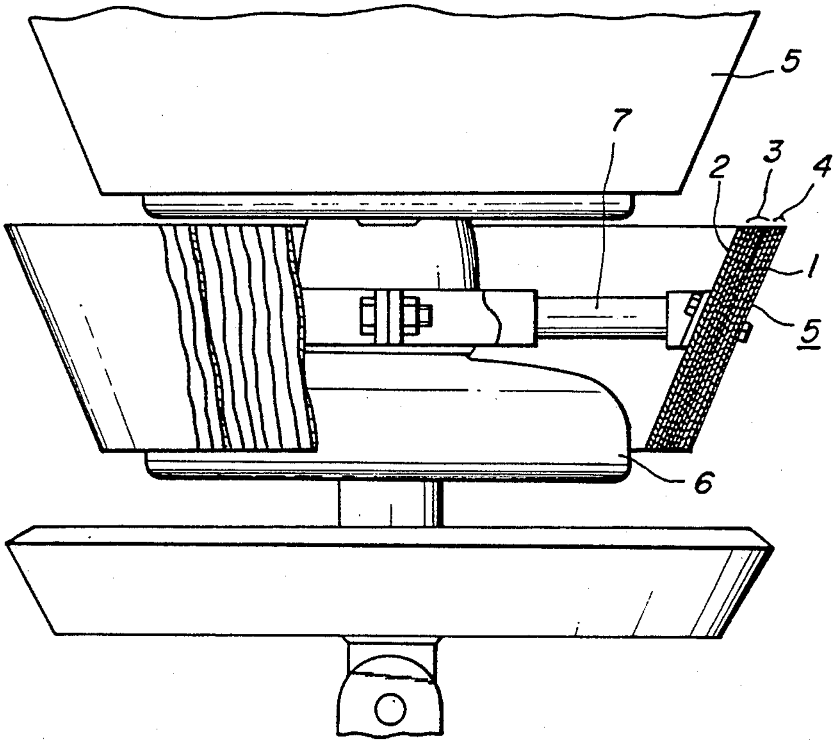
FIG. 2 is a partially cutaway fractional side view of an insulator string with a ring formed of the bullet-proof board according to the invention attached thereto.

FIG. 2 shows a ring member 5 which is made by shaping the bullet-proof board of the invention into the form of a sidewall of a circular truncated cone. If the ring member 5 is mounted on an insulator 6 by an insulating holder rod 7 in such a manner that the diameter of the ring member 5 increases with upward extending thereof, reliable protection of the insulator 6 against damage by rifle bullets and the like is provided.

The invention will be described in further detail by referring to an example.

EXAMPLE

Specimen 1 of the bullet-proof board of the invention as shown in FIG. 1 was prepared by forming a thick intermediate layer 3 by laminating six 1.5 mm thick nylon belts, sandwiching the intermediate layer 3 between two 3.0 mm thick steel plates 1 and 2, and forming a surface layer 4 on the outer surface of the outer steel plate 1 by laminating two 1.5 mm thick nylon belts thereon.

Gun shot tests were carried out by firing ten shots with a long rifle of 0.22 inch bore, which was loaded with 222 Remington bullets, at a short distance of 15 meter. The bullet speed was 960 m/s, and the bullet energy was 150 kg·m. None of the ten shots penetrated through the bullet-proof board or bounced therefrom.

Specimen 2 of the bullet-proof board of the invention was made in a similar manner to Specimen 1 except that an intermediate layer 3 was formed of a 5 mm thick FRP sheet and that a surface layer 4 was made of a 2 mm thick FRP sheet. Gun shot tests were carried out in the same manner as those for Specimen 1, and satisfactory bullet-stopping performance of Specimen 2 was proved by the gun shot tests.

Table 1 shows the thicknesses of the above-mentioned Specimens 1 and 2 and also relative weights of such Specimens based on weights of Reference bullet-proof boards which render similar performance as the above Specimens but are made of other materials. The thicknesses of Reference bullet-proof boards are also shown in Table 1.

TABLE 1

| Bullet-proof board | | Structure | Total thickness (mm) | Relative weight (%) |
|---|---|---|---|---|
| Invention | Specimen 1 | Steel plate: 3.0 mm × 2<br>Intermediate layer:<br>nylon belt 1.5 mm × 6<br>Surface layer:<br>nylon belt 1.5 mm × 2 | 18.0 | 67 |
| | Specimen 2 | Steel plate: 3.0 mm × 2<br>Intermediate layer:<br>FRP sheet 5 mm<br>Surface layer:<br>FRP sheet 2 mm | 13 | 67 |
| Reference | Specimen | | | |
| | 3 | All soft steel (SS41) | 13 | 100 |
| | 4 | All high-tension steel (HS80) | 8 | 73 |
| | 5 | All tool steel (SK4) | 9 | 80 |
| | 6 | All FRP sheet | 30 | 67 |

As described above, the bullet-proof board according to the invention is lighter than a conventional all steel bullet-proof board and yet provides excellent bullet-proof performance by preventing a high-energy bullet from penetrating through the board without requiring any excessive increase of its overall thickness. Besides, the bullet-proof board of the invention prevents a striking bullet from bouncing, so that the risk of damage of nearby hardwares on transmission line towers by bounced bullets is remarkably reduced. Thus, the bullet-proof board of the invention is particularly suitable of protection of transmission line insulators against bullets, and the invention has made a very valuable and highly practical contribution to the industry.

A bullet-proof ring using the structure of the above-mentioned board will be described in detail now.

Figure 5:
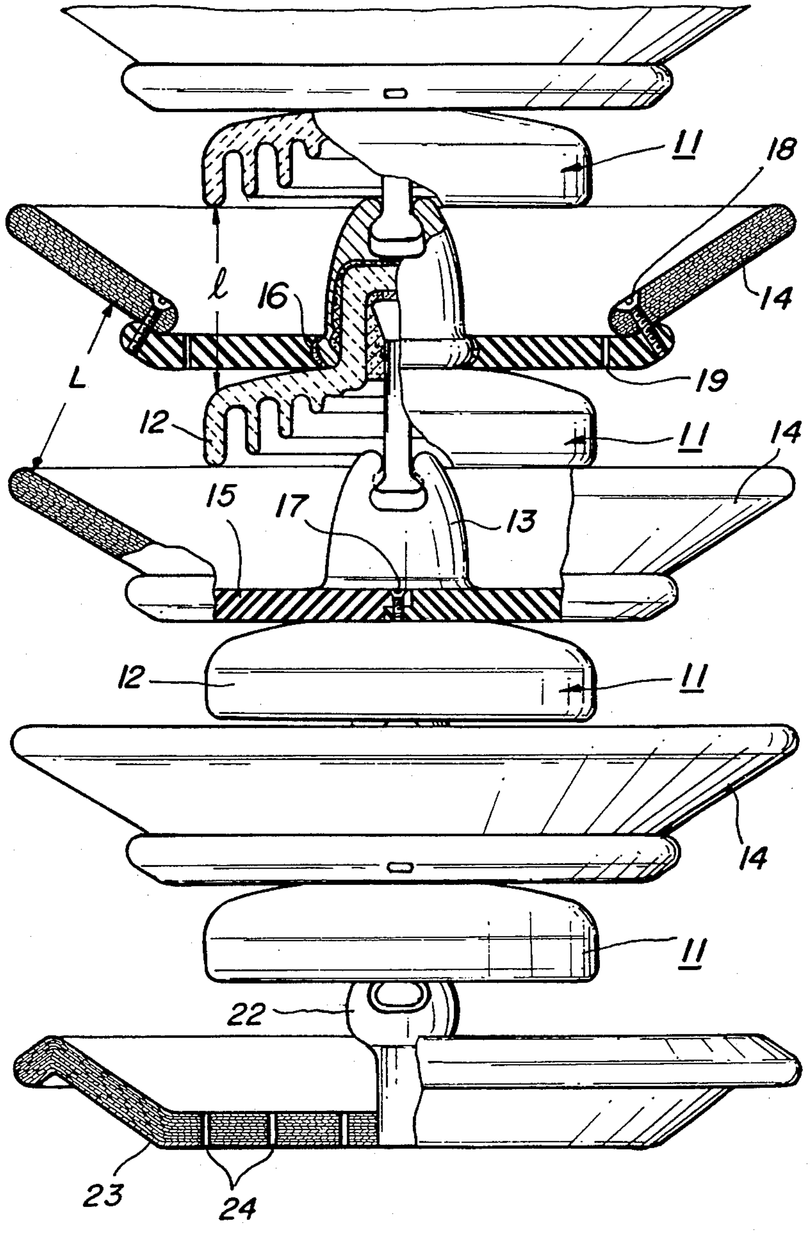
FIG. 5 is partially cutaway fractional side aview of a bullet-proof insulator string assembly according to the invention.

Referring to FIG. 5, an insulator string is formed by connecting two or more suspension insulators 11. Each suspension insulator 11 has a shed portion 12 to which a metal cap 13 is secured thereto. A bullet-proof ring 14 is mounted on the metal cap 13 of each insulator 11 so as to face the outer peripheral surface of the shed portion 12. The bullet-proof ring 14 has a shape representing a sidewall of a truncated cone, and its minimum inside diameter is larger than the outside diameter of the shed portion 12 of the suspension insulator 11 preferably by more than 40 mm. Thus, when it rains, rain water dripping from the lower end of the bullet-proof ring 14 does not directly hit the shed portion 12 of the insulator 11 below that bullet-proof ring 14.

When the firing angle of a bullet which hits an insulator 11 of the insulator string is represented by an angle relative to a vertical shot, namely by assuming that a vertical shot from immediately below the insulator string is represented by zero degree, it is preferable to protect the insulator 11 against bullets, such as rifle bullets, over the entire range of the firing angle of 0–90 degrees. To this end, the bullet-proof ring 14 of FIG. 5 is mounted on the insulator 11 so as to assume a posture of an inverted truncated circular cone; namely, as extending upwards, the bullet-proof ring 14 increases its diameter at an inclination of 45–70 degrees relative to the direction of the longitudinal axis of the suspension insulator string (to be referred to as the "suspension axis" hereinafter).

Figure 8:
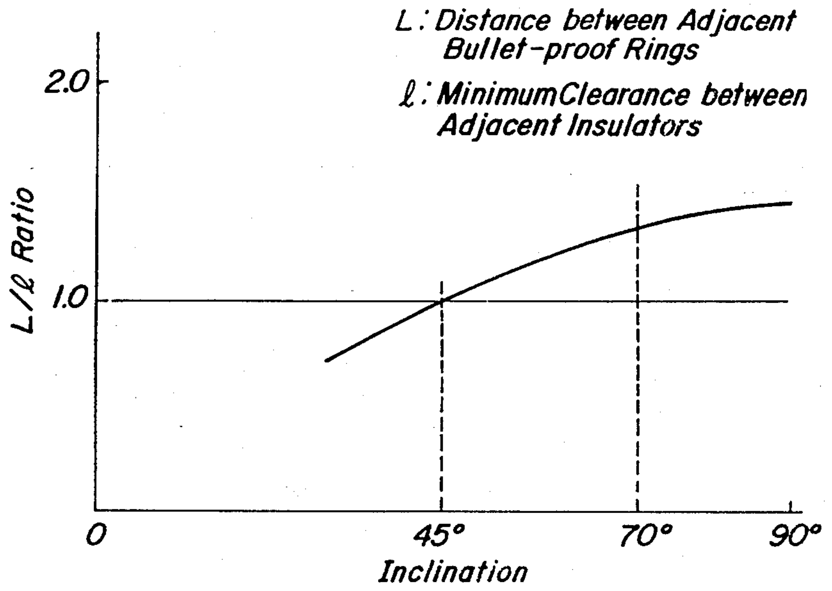
FIG. 8 is a graph showing the relationship between the inclination of a bullet-proof ring and the spacing between adjacent bullet-proof rings (L)
Figure 9:
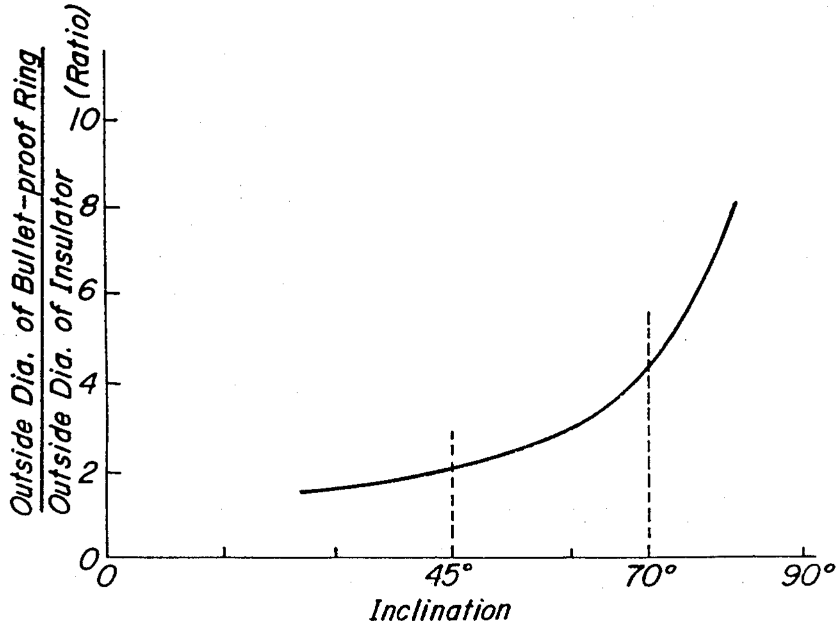
FIG. 9 is a graph showing the relationship between the inclination of a bullet-proof ring and the outside diameter of the bullet-proof ring.

Referring to FIG. 8, if the above-mentioned inclination of the bullet-proof ring 14 is less than 45 degrees, the distance between adjacent bullet-proof rings (L) becomes smaller than the minimum clearance between adjacent suspension insulators (l). As a result, at the time of a lightning strike or the like, a flashover may occur across adjacent bullet-proof rings 14, so that the electrical insulation strength of the overall insulator string may be deteriorated. On the other hand, if the above-mentioned inclination of the bullet-proof ring 14 is more than 70 degrees, an unduly large outside diameter is required for the bullet-proof ring 14 to provide protection over the firing angle range of 0–90 degrees, as can be seen from FIG. 9. Thus, the preferable range of the inclination of the bullet-proof ring 14 is 45–70 degrees.

The bullet-proof ring 14 should be capable of preventing a high-energy bullet, such as a 222 Remington bullet, from penetrating therethrough. If an all FRP board is used to realize such capability, a thickness of more than 30 mm is necessary. In the illustrated embodiment, the wall of the bullet-proof ring 14 is made by laminating metal plates and resin sheets, and the thickness of the wall is about 18 mm and yet the above capability is fulfilled. Further, the weight of the wall of the illustrated bullet-proof ring 14 is only 60% of the weight of an all metal bullet-proof board of similar capability.

Figure 6:
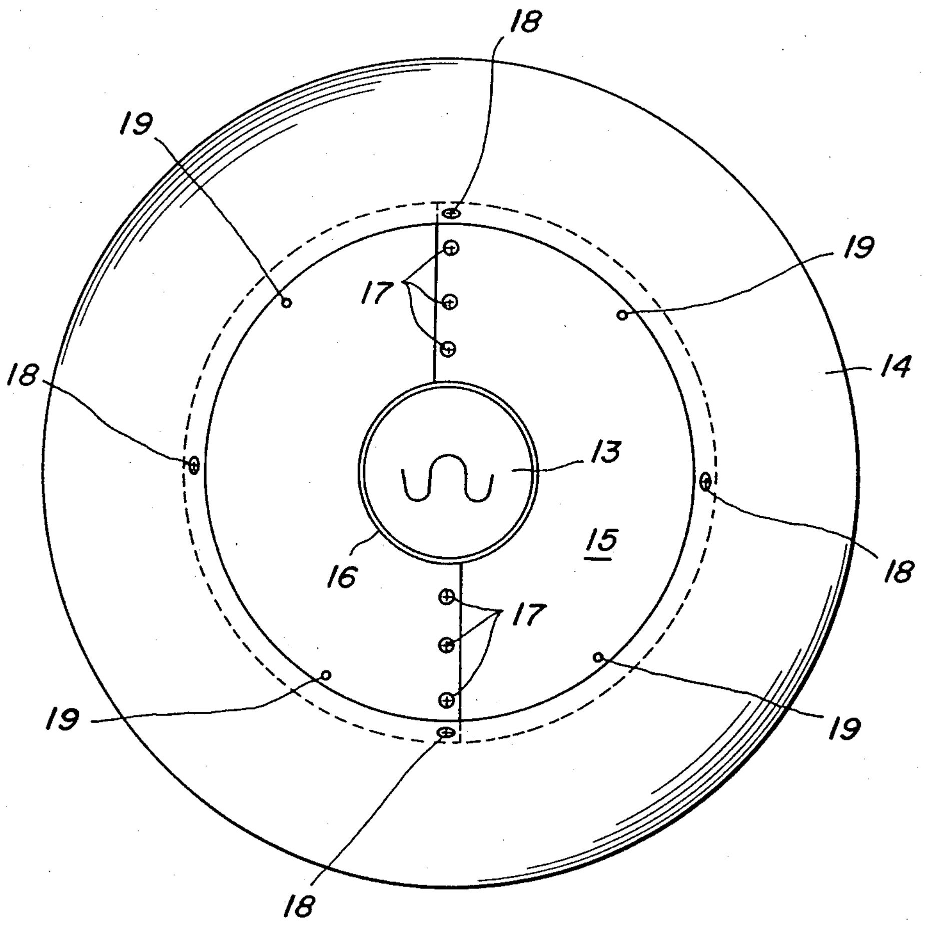
FIG. 6 is a plan view of the bullet-proof insulator string assembly of FIG. 5.

A holder 15 fastens the bullet-proof ring 14 to the outer periphery of the suspension insulator 11. In the embodiment of FIG. 5 and FIG. 6, the holder 15 is a disk, which is made of insulating material and separable into two halves. The holder 15 of this embodiment is secured to the periphery of the metal cap 13 of the insulator 11 in the following manner: namely, a semicircular recess at the central portion of each half of the holder 15 is brought into tight contact with the outer surface of the metal cap 13 of the insulator 11 while inserting a rubber packing or other packing 16 therebetween, and the two halves thus brought into contact with the metal cap 13 are joined by bolts 17 at mating portions thereof as shown in FIG. 6. The bullet-proof ring 14 is secured to the circumferential portion of the holder 15 by bolts 18.

When mounted by the disk-shaped holder 15, the bullet-proof ring 14 holds rain water in a space above the holder 15. As the space above the holder 15 within the bullet-proof ring 14 is filled, the rain water overflows along the outer rim of the ring 14 and drops along outside of the insulator string. Thereby, the rain water is prevented from directly hitting the insulators 11. It is preferable to provide small holes 19 through the holder 15 along the outer periphery thereof, so that the rain water pooled above it may gradually drain through such small holes 19.

Figure 7:
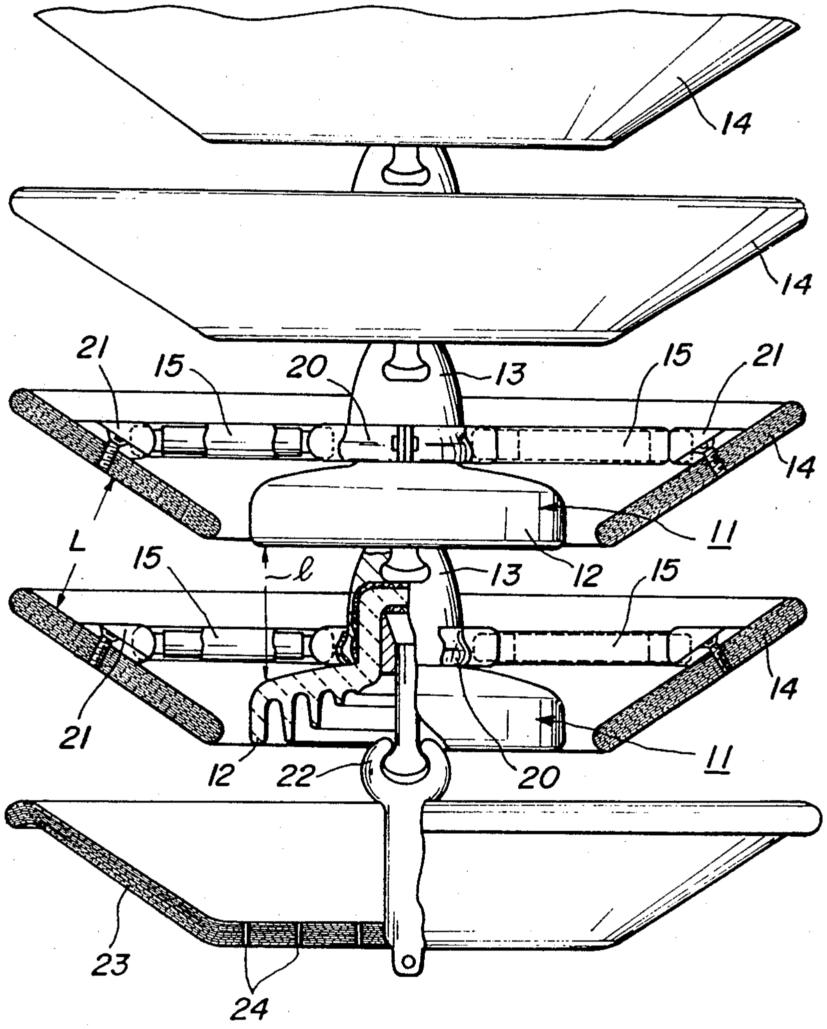
FIG. 7 is partially cutaway fractional side view of another bullet-proof insulator string assembly according to the invention.

FIG. 7 shows another embodiment of the holder 15 which uses holder rods made of insulating material such as FRP. Opposite ends of each holder rod of the holder 15 are threaded. The inner end of each holder rod is screwed into a nut portion of a metal band 20 which is mounted on the metal cap 13 of the insulator 11. The outer end of each holder rod is screwed into a nut 21 which is secured to the inner surface of the bullet-proof ring 14. Whereby, the bullet-proof ring 14 is secured to the metal cap 13 of the insulator 11.

To protect the holder 15 made of FRP against deterioration of its insulating strength due to sun beams and rain water, it is preferable to coat such rod with EP (ethylene-propylene) rubber or other substance having excellent weather resistibility. The surface of the holder rod may be corrugated to increase its creepage distance.

When the bullet-proof rings 14 are mounted on the outside of the suspension insulators 11 of an insulator string by the holders 15, which holders are made of insulating material, the bullet-proof rings 14 should be in such a posture that the distance between adjacent bullet-proof rings (L) should be longer than the minimum clearance between adjacent suspension insulators (l) so as to ensure proper insulating strength of the insulator string assembly including the rings 14.

The inventors confirmed by tests that if the bullet-proof rings 14 are mounted in the above-mentioned manner, the insulating strength of the insulator string assembly including such rings 14 can be maintained at a level which is substantially the same as the case without the bullet-proof rings 14.

Figure 10A:
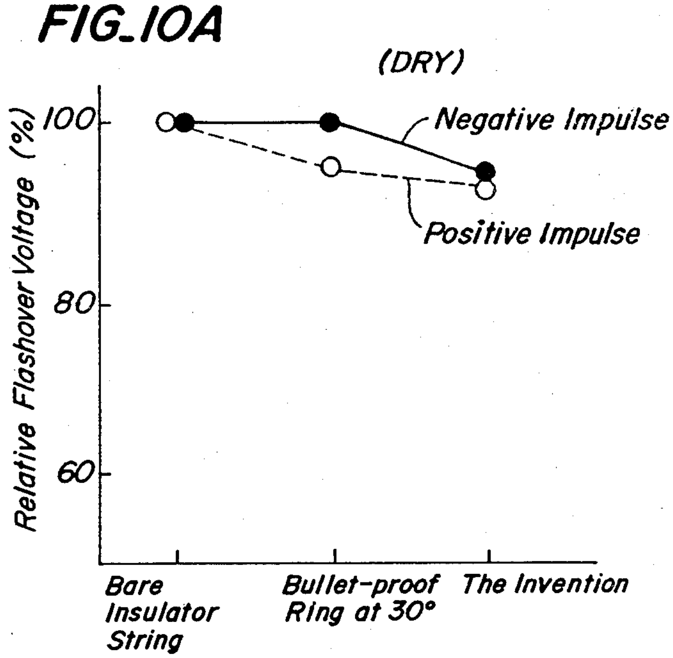
FIG. 10A and FIG. 10B are graphs showing the lightning impulse-flashover characteristics of different insulator strings.
Figure 10B:
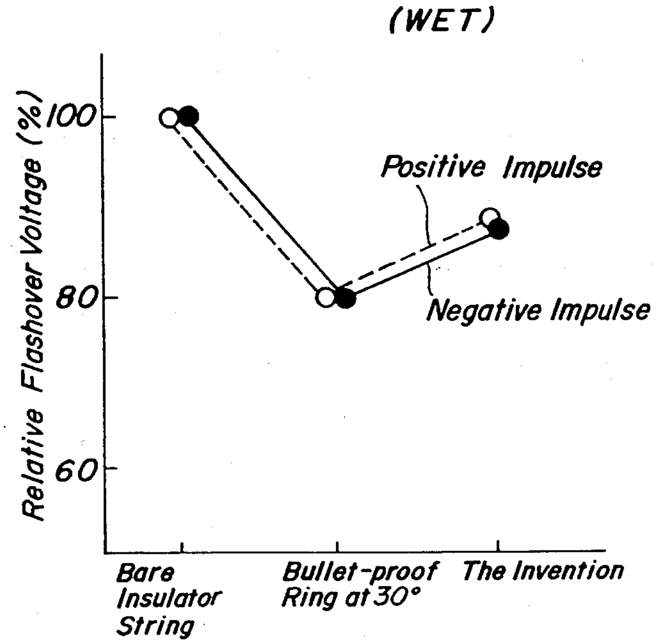
Figure 11A:
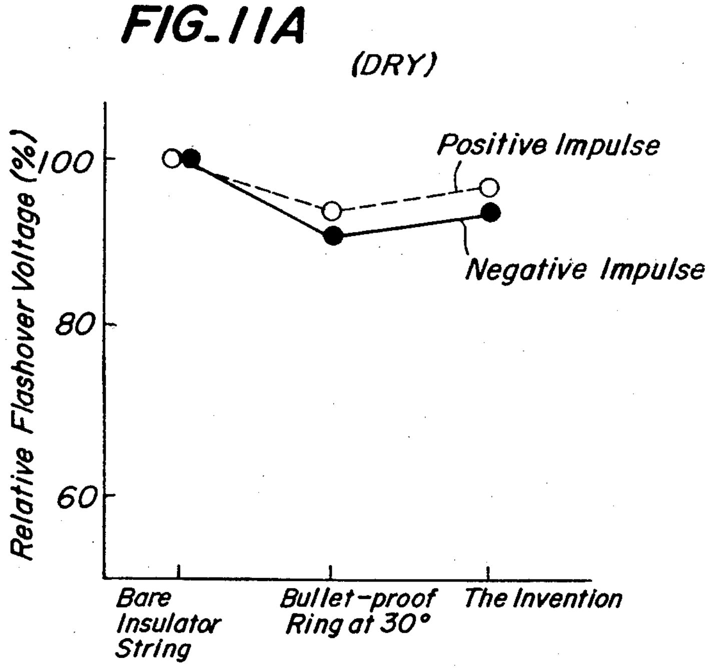
FIG. 11A and FIG. 11B are graphs showing the switching impulse-flashover characteristics of different insulators strings.
Figure 11B:
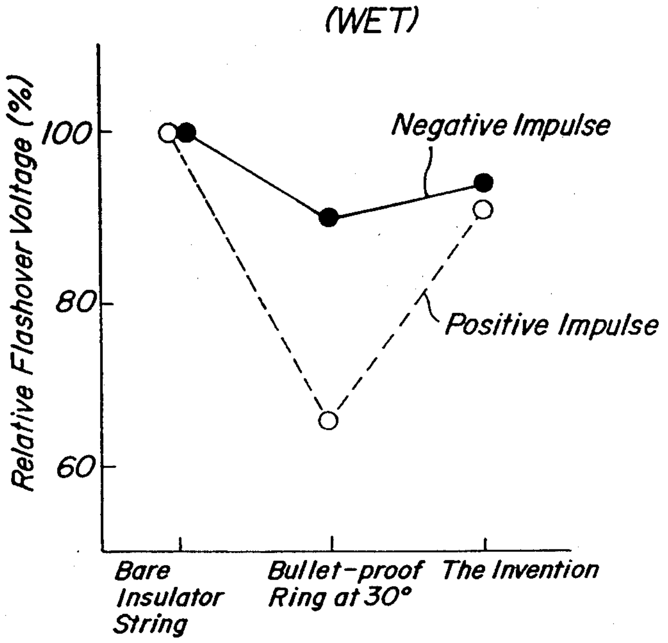

More particularly, electrical tests were made by using strings of suspension insulators 11, each of which suspension insulators 11 had an insulation strength of 45 kV (power frequency withstand voltage under wet conditions). When bullet-proof rings 14 are mounted on a string of suspension insulators 11 with an inclination of 30 degrees relative to the suspension axis (outside the scope of the invention), the wet flashover voltage for lightning impulse dropped to 80% of that for a bare (without the bullet-proof rings) insulator string as shown in FIG. 10B, and the wet flashover voltage for switching impulse dropped to 65% of that for the bare insulator string as shown in FIG. 11B. On the other hand, when the bullet-proof rings 14 of FIG. 5 according to the invention were mounted on the same insulator string, the wet flashover voltage for lightning impulse maintained 89% of that for the bare insulator string, and the wet flashover voltage for switching impulse maintained 91% of that for the bare insulator string.

Regardless of the type of the holder 15, for protection against bullets from immediately below, it is preferable to mount a dish-shaped bullet-proof member 23 onto the lowermost suspension insulator 11 by using a metal socket 22. A number of small holes 24 are preferably provided through the bottom wall of such member 23, so as to drain the rain water.

As described in detail in the foregoing, the bullet-proof ring 14 with an inclination of 45–70 degrees relative to a vertical shot prevents penetration of bullets from a rifle or the like at a firing angle of 0–90 degrees, so that insulator breakages and resultant insulator string separation due to bullet hitting can be prevented. The mounting of the partially metallic bullet-proof rings 14 around the insulators causes a change in the voltage distribution in the insulator string. However, the insulation strength of the insulator string can be maintained without any serious decrease by the following means; namely, by using holders 15 made of insulating material, by inclining the wall of the bullet-proof ring 14 by 45–70 degrees relative to the direction of the suspension axis of the insulator string, and by making the distance between the adjacent bullet-proof rings (L) larger than the minimum clearance between adjacent suspension insulators (l): i.e., (L<l). In particular, a high reliability against impulses at lightning strikes can be ensured.

The first embodiment of the bullet-proof ring as shown in FIG. 5 prevents formation of flashover paths under wet conditions by holding rain water in the bullet-proof ring 14 combined with the disk-shaped holder 15. After filling up the inside of the bullet-proof ring 14, the rain water is allowed to overflow over the upper rim of the ring 14 and drop along paths which are clearly spaced from the suspension insulators 11. In the case of the second embodiment of the bullet-proof ring as shown in FIG. 7, the rain water drops from the inside surface of the bullet-proof ring 14. However, since the minimum inside diameter of the bullet-proof ring 14 is larger than the outside diameter of the suspension insulator 11, the rain water from the bullet-proof ring 14 is prevented from directly hitting the suspension insulator 11 below, whereby formation of flashover paths under wet conditions is prevented. The mounting of the bullet-proof rings 14 by the holders 15 of the rod type does not interfere with the inspection of insulators of the power transmission line from air by helicopters or the like.

In short, the invention provides a bullet-proof ring for transmission line insulator strings which ring prevents insulators strings from being damaged even when they are hit by rifle bullets or the like, while the bullet-proof ring substantially maintains the original insulating strength of the insulator string before mounting the bullet-proof rings. Thus, the bullet-proof ring of the invention is very useful as a practical protector of overhead power transmission lines which pass through areas where disturbances due to gun shooting have occurred rather frequently.

What is claimed is:

1. A bullet-proof insulator assembly comprising, an insulator string formed from a plurality of suspension insulators coupled to each other, each suspension insulator having a metal cap; bullet-proof rings, one of said bullet-proof rings being mounted on each of the suspension insulators, each bullet-proof ring having a shape representing a sidewall of a truncated-cone with a minimum inside diameter greater than an outside diameter of a shed portion of the suspension insulator, and holders mounting each of said bullet-proof rings to the suspension insulators such that each bullet-proof ring is insulated from each corresponding metal cap and each bullet-proof ring extends away from a longitudinal axis of the insulator string at an angle of 45–70 degrees relative to the longitudinal axis as the bullet-proof ring extends upwardly and that the minimum distance between adjacent bullet-proof rings (L) is longer than the minimum distance between adjacent suspension insulators (l).

2. A bullet-proof insulator assembly comprising, an insulator string formed from a plurality of suspension insulators coupled to each other, each suspension insulator having a metal cap; bullet-proof rings, one of said bullet-proof rings being mounted on each of the suspension insulators, each bullet-proof ring having a shape representing a sidewall of a truncated-cone with a minimum inside diameter greater than an outside diameter of a shed portion of the suspension insulator; and holders mounting each of said bullet-proof rings to the suspension insulators such that each bullet-proof ring extends away from a longitudinal axis of the insulator string at an angle of 45–70 degrees relative to the longitudinal axis as the bullet-proof ring extends upwardly and that the minimum distance between adjacent bullet-proof rings (L) is longer than the minimum distance between adjacent suspension insulators (l); wherein each of said bullet-proof rings comprises two annular steel plates having substantially identical thicknesses, a thick annular intermediate layer sandwiched between the two annular steel plates, the annular intermediate layer being thicker than either of the annular steel plates and comprising a material selected from the group consisting of chemical fiber cloths and synthetic resin sheets, and a thin annular surface layer disposed on an outermost surface of one of the two annular steel plates, the surface layer being thinner than the intermediate layer and comprising a material selected from the group consisting of chemical fiber cloths and synthetic resin sheets and said surface layer being positioned such that it faces a direction from which a high velocity projectile originates.

* * * * *